(12) United States Patent
Bierman et al.

(10) Patent No.: US 12,196,271 B1
(45) Date of Patent: Jan. 14, 2025

(54) CLUTCH HOUSING AND METHODS FOR PREVENTING DAMAGE TO CLUTCH HOUSINGS FROM CLUTCH PLATES

(71) Applicant: Sonnax Transmission Company, Bellows Falls, VT (US)

(72) Inventors: Nathan Bierman, Keene, NH (US); Gregg Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 18/628,208

(22) Filed: Apr. 5, 2024

(51) Int. Cl.
| F16D 13/58 | (2006.01) |
| B23P 6/00 | (2006.01) |
| F16D 13/64 | (2006.01) |
| F16D 13/68 | (2006.01) |

(52) U.S. Cl.
CPC ............... F16D 13/58 (2013.01); B23P 6/00 (2013.01); F16D 13/646 (2013.01); F16D 13/683 (2013.01); *F16D 2200/0021* (2013.01); *F16D 2250/0084* (2013.01); *F16D 2300/10* (2013.01)

(58) Field of Classification Search
CPC .......... F16D 13/58; F16D 13/62; F16D 13/60; F16D 13/64; F16D 13/644; F16D 13/646; F16D 13/68; F16D 13/683; F16D 13/686; F16D 2200/0021; F16D 2200/003; F16D 2250/0084; F16D 2300/12; F16D 2300/26
See application file for complete search history.

(56) References Cited

U.S. PATENT DOCUMENTS

| 4,574,449 A | * | 3/1986 | Wussow | ............... F16D 13/683 29/402.06 |
| 5,642,958 A | * | 7/1997 | Sugiyama | ............. F16D 13/686 403/359.6 |
| 6,272,725 B1 | * | 8/2001 | Stout, Jr. | ............... F16D 13/683 29/402.09 |
| 6,637,574 B2 | * | 10/2003 | Landa | ................. F16H 63/3026 192/115 |

(Continued)

FOREIGN PATENT DOCUMENTS

DE 2608348 A * 9/1976 ........... F16D 13/683

OTHER PUBLICATIONS

DE2608348A1 translation.*

(Continued)

*Primary Examiner* — Timothy Hannon
(74) *Attorney, Agent, or Firm* — Andrus Intellectual Property Law, LLP

(57) ABSTRACT

A method of preventing damage to a clutch housing includes removing material such that the castellations that are adjacent to each other are separated by second distances that are greater than first distances therebetween before removing the material, where the first distances are sufficient for positioning splines of a clutch plate therein. The method further includes positioning wear inserts where the material was removed from the castellations. The wear inserts positioned with castellations that are adjacent to each other are separated by third distances that are less than the second distances between the castellations that are adjacent to each other. The third widths are sufficient for positioning the splines of the clutch plate therein. The wear inserts prevent the splines of the clutch plate from damaging the clutch housing in use.

23 Claims, 12 Drawing Sheets

(56) References Cited

U.S. PATENT DOCUMENTS

| | | | |
|---|---|---|---|
| 7,204,357 B1 | 4/2007 | Dumas | |
| 8,607,952 B2 * | 12/2013 | Keating | F16D 13/683 |
| | | | 192/112 |
| 11,401,979 B2 * | 8/2022 | Youngwerth | F16D 13/52 |
| 2015/0292569 A1 * | 10/2015 | Youngwerth | F16D 13/648 |
| | | | 192/107 R |
| 2024/0026936 A1 | 1/2024 | Copeland | |

OTHER PUBLICATIONS

"68RFE 700 Pro Series Billet STEEL Input Clutch Drum, Patent Pending" accessed from https://revmaxconverters.com/product/68rfe-700-pro-series-billet-steel-input-clutch-drum-patent-pending/ on Feb. 27, 2024.

"FTI Transmissions & Coverters Case Savers Powerglide" accessed from https://www.jegs.com/i/FTI-Transmissions-Converters/107/F2504CS/10002/-1 on Jan. 9, 2024.

* cited by examiner

CLUTCH HOUSING AND METHODS FOR PREVENTING DAMAGE TO CLUTCH HOUSINGS FROM CLUTCH PLATES

FIELD

The present disclosure generally relates to clutch housings for vehicle transmissions, and more particularly to clutch housings and methods for preventing damage to clutch housings from clutch plates.

BACKGROUND

The following are incorporated herein by reference in entirety.

U.S. Pat. No. 7,204,357 discloses a high performance clutch pack for use in the high gear clutch of a transmission. The present clutch pack is disposed in a modified clutch drum including fluid exhaust vents to reduce piston drag and weight reduction features for accommodating up to ten friction disks and eleven steel disks representing a 150 percent increase in holding force in comparison to a stock clutch pack, which typically provides only four friction disks and five steel disks. In one embodiment the steel disks include elliptically shaped holes at predetermined locations for imparting turbulence to the flow of transmission fluid within the clutch pack and also feature anti-drag spacers for reducing parasitic drag during freewheeling. The clutch pack is actuated by a modified clutch piston having an increased stroke correlated to the increased number of friction disks delivering maximum holding force with minimal increase in rotating mass.

U.S. Patent Application Publication No. 2024/0026936 discloses methods and apparatuses that can be used to adjust the torque transfer capacity and improve the overall performance and longevity of a clutch assembly. Through the use of various improved clutch components disclosed herein, it is possible to: (1) increase clutch apply forces through an increase in the fluid pressure apply surface area, or piston reaction area, of a clutch piston, thereby increasing frictional forces generated within a clutch pack for transferring input torque from a drive shaft to a driven shaft; (2) improve clutch plate contact conditions through a more rigid clutch pressure plate configuration, thereby reducing clutch pack/plate distortion and supporting structure deformation and/or wear that can otherwise lead to excessive heat generation and overall clutch performance degradation and/or failure; and/or (3) improve the clutch assembly's ability to dissipate and/or tolerate heat generated through clutch plate friction by means of an improved clutch pack configuration.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a method of preventing damage to a clutch housing includes removing material such that the castellations that are adjacent to each other are separated by second distances that are greater than first distances therebetween before removing the material, where the first distances are sufficient for positioning splines of a clutch plate therein. The method further includes positioning wear inserts where the material was removed from the castellations. The wear inserts positioned with castellations that are adjacent to each other are separated by third distances that are less than the second distances between the castellations that are adjacent to each other. The third widths are sufficient for positioning the splines of the clutch plate therein. The wear inserts prevent the splines of the clutch plate from damaging the clutch housing in use.

In certain examples, the material is removed from opposing sides of each of the castellations.

In certain examples, the castellations are positioned in a circular arrangement such that inner faces face radially inwardly, and the method further includes removing material from the inner faces of the castellations that face radially inwardly from the circular periphery, and positioning the wear inserts where the material was removed from the inner faces.

In certain examples, the material is removed from the castellations such that the third distances between the wear inserts positioned with castellations that are adjacent to each other are approximately equal to the first distances between the castellations that are adjacent to each other before removing the material from the castellations.

In certain examples, the castellations are positioned in a circular arrangement such that inner faces face radially inwardly, further comprising positioning a snap ring to prevent the wear inserts from moving radially inwardly away from the inner faces of the castellations.

In certain examples, the castellations are positioned in a circular arrangement such that inner faces face radially inwardly, and the wear inserts are positioned so as to span across the inner faces between opposing sides of the castellations, respectively.

In certain examples, the method further includes removing the clutch plate before removing the material from the castellations, and re-installing the clutch plate such that the splines are positioned within the open gaps after the wear inserts are positioned where the material was removed from the castellations.

Another aspect of the present disclosure generally relates to a clutch housing configured to prevent damage from a clutch plate. The clutch housing has a circular base with castellations that extend upwardly therefrom in a circular arrangement. The castellations extend from the circular base to free ends with inner faces that extend between the sides thereof, where the inner faces face radially inwardly in the circular arrangement. Wear inserts are positioned adjacent to the sides of the castellations such that open gaps remain between the castellations that are adjacent to each other and between the wear inserts positioned therewith, where the open gaps are sufficient to position splines of the clutch plate therebetween.

In certain examples, a snap ring prevents the wear inserts from moving radially inwardly away from the inner faces of the castellations.

In certain examples, a snap ring that prevents the wear inserts from moving axially away from the circular base.

In certain examples, the wear inserts each comprise sides that extend perpendicularly from a base that extends therebetween, and wherein the bases of the wear inserts are positioned to span across the inner faces of the castellations, respectively. In further examples, the sides of the wear inserts extend closer than the bases thereof to free ends of the castellations to form tabs on the sides, and the tabs prevent the wear inserts from moving radially inwardly away from the inner faces of the castellations.

In certain examples, the wear inserts comprise bases with tabs that extend therefrom, where the tabs extend farther than the main bodies from the tops of the castellations when the wear inserts are positioned with the castellations, and wherein the tabs prevent the wear inserts from moving radially inwardly away from the inner faces of the castellations. In further examples, a backing plate extends radially inwardly from the circular base, wherein the backing plate prevents the tabs from moving radially inwardly when wear inserts are positioned with the castellations. In further examples, a backing plate extends radially inwardly from the circular base, wherein the backing plate prevents the tabs from moving tangentially towards the open gaps when wear inserts are positioned with the castellations.

In certain examples, a channel is formed in at least one of the sides of each of the castellations, and wherein the wear inserts are at least partially recessed within the channels when positioned with the castellations. In further examples, the channel is further formed in the inner face of each of the castellations and the wear inserts are at least partially recessed therein.

In certain examples, a closest distance between the castellations that are adjacent to each other is approximately equal to a closest distance between the wear inserts positioned therewith.

In certain examples, the castellations comprise aluminum and the wear inserts comprise steel.

Another aspect of the present disclosure generally relates to a method for modifying a clutch housing to preventing damage thereto. The method includes removing a first clutch plate from the clutch housing, the first clutch plate having splines configured to be positioned between sides of castellations of the clutch housing. The method further includes positioning wear inserts adjacent to the castellations, wherein each of the castellations comprises an inner face that extends between the sides therebetween, the inner face facing radially inwardly, wherein the wear inserts each comprise sides that extend perpendicularly from a base, wherein the wear inserts are positioned such that the sides thereof are adjacent to the sides of the castellations and such that the base of the wear inserts spans across the inner faces of the castellations. The method further includes positioning a second clutch plate within the clutch housing such that splines of the second clutch plate are positioned between the sides of the wear plates, wherein an open space between the sides of the wear inserts is narrower than the splines of the first clutch plate, and wherein the splines of the second clutch plate are narrower than the splines of the first clutch plate so as to fit between the sides of the wear plates.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

DETAILED DESCRIPTION

Automotive transmissions include, among other components, a clutch assembly. The interposition of the clutch assembly between a drive shaft and a driven shaft permits the drive shaft, connected to a motor or an engine, to be releasably coupled to the driven shaft. This coupling through the clutch assembly may cause the driven shaft to rotate at the same rate as the drive shaft, a different rotation rate from the drive shaft, or to be completely decoupled from the drive shaft.

One component of the clutch assembly that enables the releasable coupling of the drive shaft to the driven shaft is a stack of friction elements often referred to as a clutch pack. Clutch packs typically comprise interleaved disks often referred to as clutch plates. Some of these plates have friction material bonded to opposing faces of a steel core plate, often referred to as double-sided clutch plates, while others are bare steel clutch plates without any friction material. Clutch plates are alternately stacked such that the friction material on one plate contacts a mating steel reaction face of an adjacent steel clutch plate. As an alternative to double-sided clutch plates, another type of clutch plate, sometimes referred to as a single-sided clutch plate, has friction material bonded to a single face of a steel core plate with the opposing face of the steel core plate left bare. Similarly to double-sided clutch plates, single-sided clutch plates are stacked such that the friction material on one plate contacts a mating steel reaction face of an adjacent clutch plate.

Interleaved stacks of clutch plates can transfer torque from a drive shaft to a driven shaft via friction at the mating faces, or they can be decoupled from one of the shafts, thereby preventing the transfer of torque. Given this arrangement, a clutch assembly is limited in the amount of torque that it can transfer from the drive shaft to the driven shaft in part by the torque that the clutch pack can withstand without excessive slippage. When an upper frictional torque limit is exceeded, the clutch plates in the clutch pack can slip with respect to one another. Excessive slippage results in clutch performance degradation and premature clutch plate wear and failure.

Figure 1:
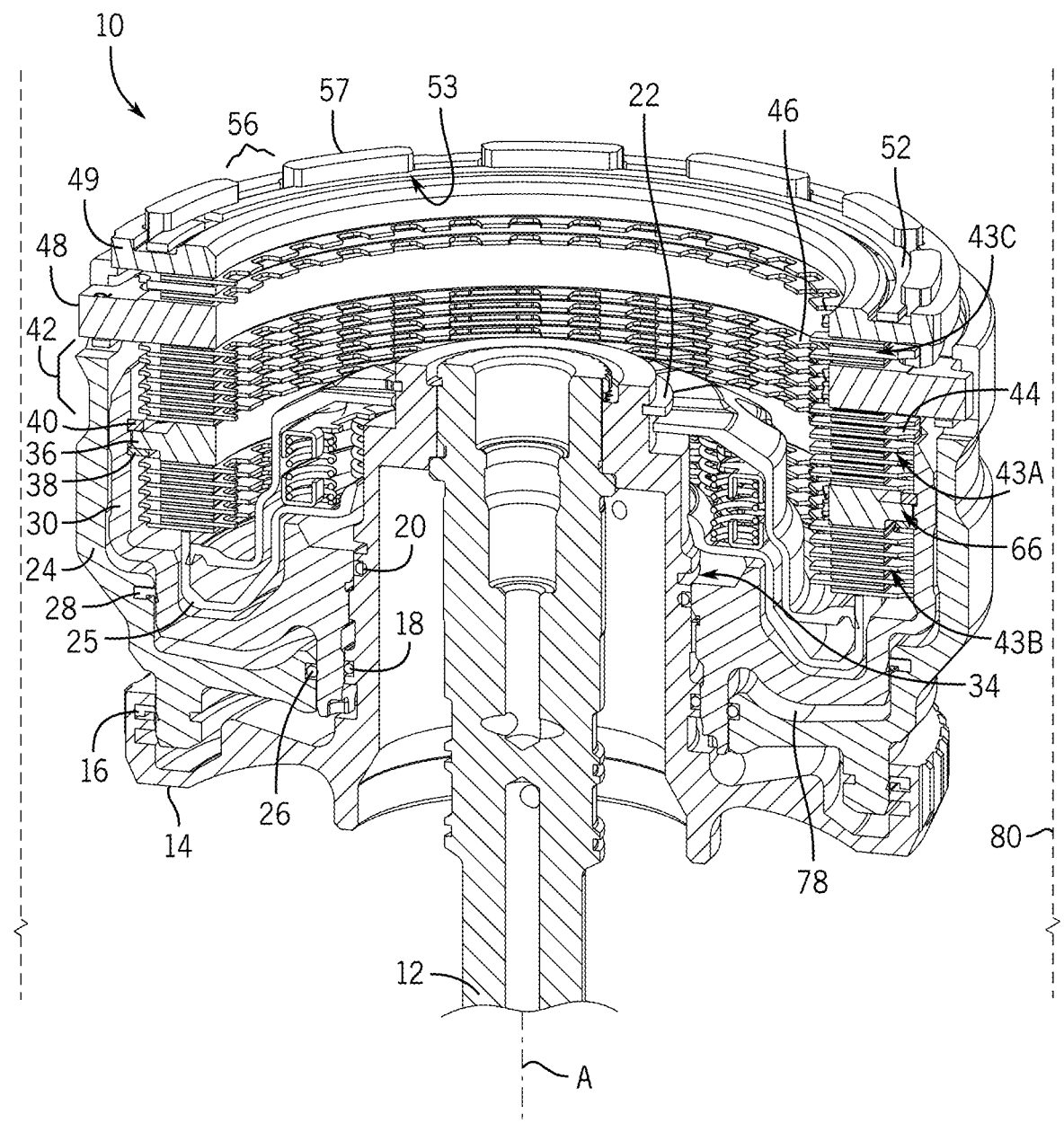
FIG. 1 is a sectional perspective view of an original equipment (OE) clutch inner housing and OE clutch plates as known in the prior art.
Figure 2:
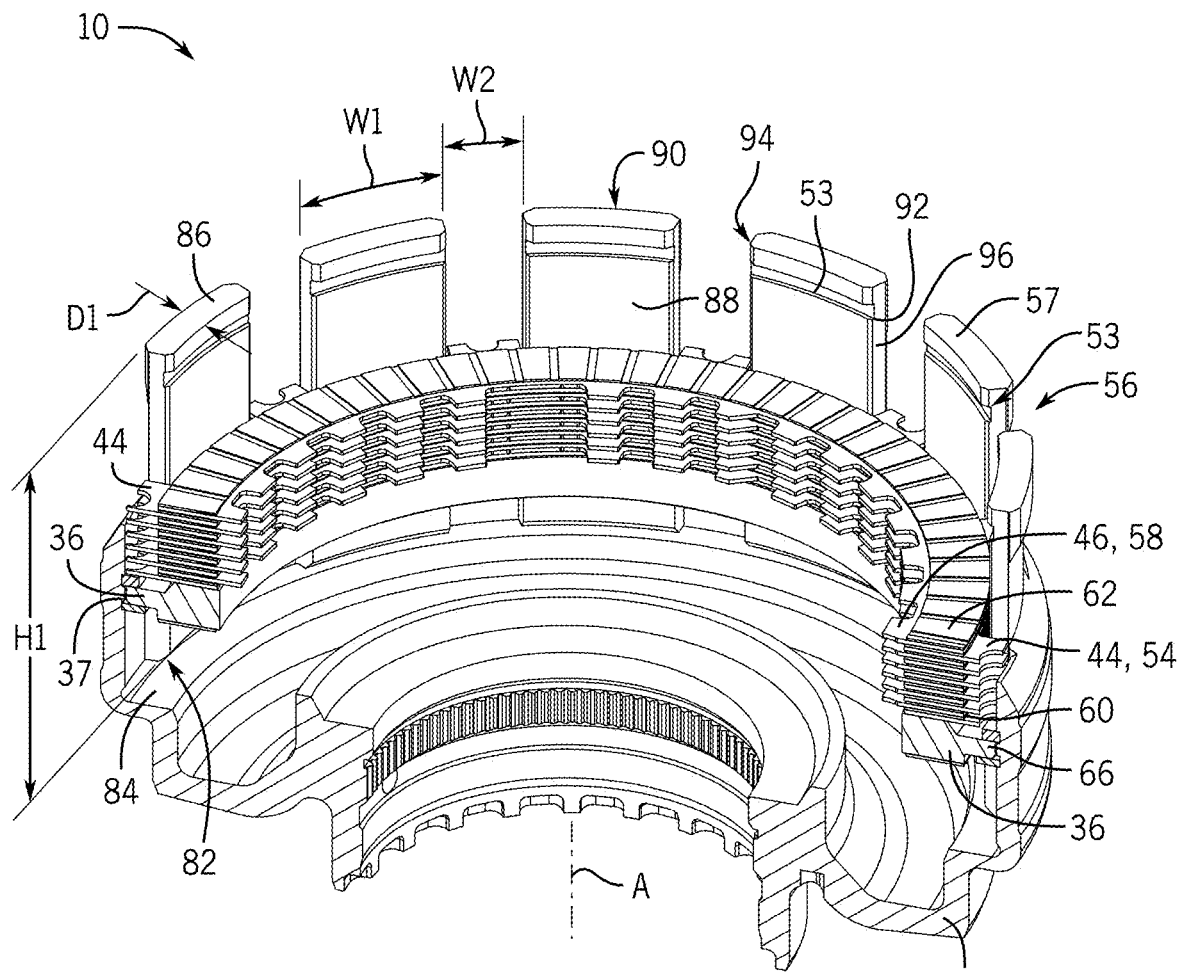
FIG. 2 is a sectional perspective view of the OE clutch inner housing of FIG. 1 with additional OE clutch plates and components installed therewith as known in the prior art.

FIGS. 1 and 2 show a traditional clutch assembly 10, in this example an OEM clutch assembly for Chrysler transmission model numbers 68RFE, 66RFE, 65RFE, 45RFE, and 545RFE, may include an input (or drive) shaft 12, a clutch hub 14 (also referred to as an input hub), a lip seal 16, o-rings 18 and 20, an underdrive piston retaining ring 22, a clutch piston 24 (also referred to as an outer piston), an underdrive apply piston 25, an o-ring 26, a lip seal 28, an annular inner clutch retainer 30 (also referred to as an inner retainer), a retaining ring (not shown, but that is positionable within the slot 34), a clutch reaction plate 36 (also referred to as an overdrive/underdrive backing plate), reaction plate retaining rings 38 and 40 (also referred to as lower and upper overdrive/underdrive backing plate snap rings respectively), clutch packs 42 each consisting of externally-toothed clutch plates 44 and internally-toothed clutch plates 46 (also referred to separately as an overdrive clutch pack 43A, an underdrive clutch pack 43B, and a reverse clutch pack 43C, all of which are clutch packs 42), a clutch pressure plates 48 and 49 (also referred to as a reverse/overdrive backing plate and a reverse clutch backing plate, respectively), and a pressure plate retaining rings 52 (also referred to as a reverse clutch backing plate snap ring).

Rotational and axial translation of the clutch assembly components occurs about and along central axis (A). The clutch reaction plate 36 and externally-toothed clutch plates 44 have external splines or teeth 66 and 54, respectively, located along their outer perimeters, which engage corresponding slots or gaps 56 (also referred to as open gaps) in inner clutch retainer 30. The inner clutch retainer 30 can therefore be said to have castellations 57 positioned in a circular arrangement that are separated by the gaps 56. Internally-toothed clutch plates 46 have internal teeth 58 located along their inner diameters that engage corresponding external teeth on an outer surface of a driven shaft, e.g., an intermediate or output shaft (not shown). In the example shown, ingle-sided, externally-toothed clutch plates 44 include a layer of friction material 60 bonded to one face with bare steel exposed on the opposite face; similarly, single-sided, internally-toothed clutch plates 46 include a layer of friction material 62 bonded to one face with bare steel exposed on the opposite face. Clutch plates 44 and 46 are then interleaved such that all of the friction material faces the same direction in order to create clutch pack 42. It should be recognized that while the present example referred to single-sided clutches, double sided clutches are also known and the present disclosure also contemplates applications therewith. Inner clutch retainer 30 is held fixed axially to clutch hub 14 by retaining ring (not shown, but would be positioned with in the groove 34), and rotationally through splines as conventionally known.

With respect to inner clutch retainer 30, clutch reaction plate 36 is held fixed axially by retaining rings 38 and 40, and rotationally by external teeth 66 that engage clutch retainer gaps 56. With respect to clutch piston 24, clutch pressure plate 48 is held in place axially by retaining rings, and rotationally by external teeth (not shown), that engage slots (not shown) in clutch piston 24. The retaining rings 52 are positioned within slots 53 that extend radially inwardly into the castellations 57 of the inner clutch retainer 30. The clutch pressure plate 48 has tabs on the outer diameter that fit into slots on the clutch piston 24 that lock the two together rotationally. The clutch pressure plate 48 also has slots in it that the castellation 57 fit through. This rotationally constrains the clutch pressure plate 48 to the inner clutch retainer 30. In operation, input shaft 12, clutch hub 14, inner clutch retainer 30, clutch reaction plate 36, clutch piston 24, externally splined clutch plates 44, and clutch pressure plate 48 rotate in unison.

To engage traditional clutch assembly 10, pressurized fluid passes through ports and into the annular piston chamber 78. This fluid pressure causes clutch piston 24 to translate axially from top to bottom along axis (A) from the perspective of FIG. 1. This translation causes clutch pressure plate 48 to contact overdrive clutch pack 43A. Once contact is established, the fluid pressure in chamber 78 causes clutch pressure plate 48 to compress the clutch plates in the overdrive clutch pack 43A. This compressive force generates the frictional force required to make the clutch plates in overdrive clutch pack 43A resist slippage, thereby allowing the input torque from input shaft 12 to be transferred through traditional clutch assembly 10 to an output shaft (not shown). When the clutch is engaged in this fashion, the entire clutch assembly rotates as a unit. As shown in FIG. 1, when a transmission including traditional clutch assembly 10 is properly assembled, the clutch assembly is installed along with other components within a housing 80 that protects the components from dirt and debris and helps to ensure proper lubrication is maintained.

With reference to FIG. 2, additional details are now provided for the castellations 57 of the inner clutch retainer 30. Each of the castellations 57 extends from a base 82 coupled to an annular shelf 84 of the inner clutch retainer 30 to a free end 86. A height H1 is defined between the base 82 and the free end 86 in the axial direction. The slot 53 for receiving the retaining ring 52 discussed above is closer to the free end 86 than to the base 82 in the height or axial direction.

Each castellation 57 further has an inner side 88 or inner face and an opposite outer side 90 or outer face, whereby the inner side 88 has a concave surface facing radially inwardly and the outer side 90 has a convex surface facing radially outwardly. A depth D1 is defined between the inner side 88 and the outer side 90 in the radial direction. It should be recognized that the thickness of the castellation 57 is reduced where the slot 53 is present, specifically by a slot depth 92. The depth D1 of each castellation is also reduced where a groove 37 is formed to receive the retaining ring 38 to keep the clutch reaction plate 36 from moving axially downwardly. Retaining ring 40 sits above the clutch reaction plate 36 and keeps the clutch reaction plate 36 from moving axially upwardly. The clutch reaction plate 36 has splines that fit between the castellations 57 of the inner clutch retainer 30 so as to constrain it rotationally. The depth D1 of the castellation 57 may otherwise be consistent, or may vary in different places, including having a greater thickness towards the free ends 86.

Finally, each castellation 57 also has a first side 94 and an opposite second side 96 that define a width W1 therebetween in the transverse or tangential direction, which is perpendicular to the depth D1 and the height H1. Likewise, the gaps 56 between castellations 57 can be said to have widths W2 or distances in the transverse direction. The first side 94 and the second side 96 are shown as flat surfaces.

Figure 3:
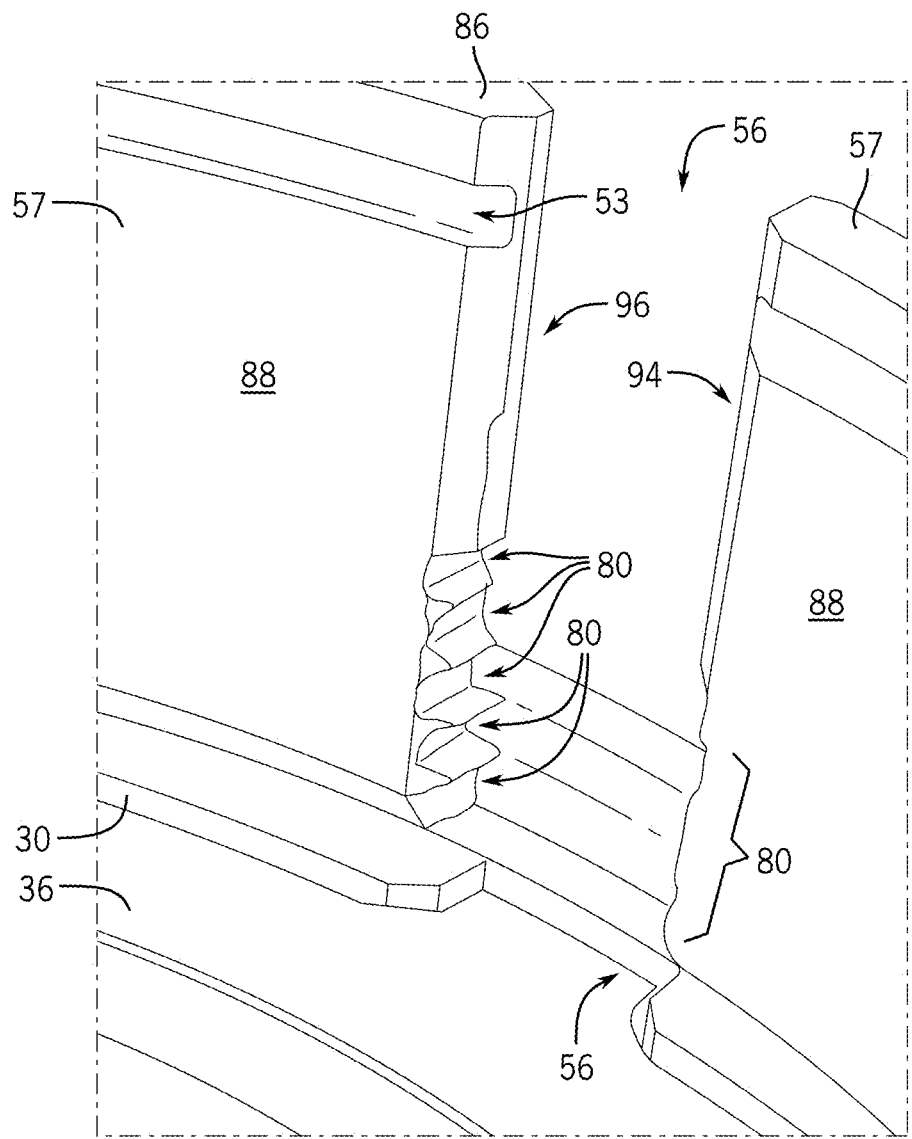
FIG. 3 is a close up view depicting damage of an OE clutch inner housing by OE clutch plates.

Through experimentation and development, the present inventors have identified that over time, conventionally known transmissions such as that shown in FIG. 1-2 are prone to extensive damage. In particular, the steel clutch plates cause extensive damage to the inner clutch retainer 30 where they contact the sides of the castellations 57. As shown in FIG. 3, the frequent impact between these steel clutch plates and the relatively soft, aluminum castellations 57 of the inner clutch retainer 30 create notches or gouges in the sides 94, 96 of the castellations 57. Since the clutch plates move relative to the inner clutch retainer 30 both rotationally and in the axial direction, these gouges are formed both into the sides 94, 96 (i.e., reducing the width W1 of the castellation 57), and in the axial direction. As the width W1 of the inner clutch retainer 30 is reduced, the gaps 56 therebetween become larger, requiring further movement of the clutch plates before engaging the inner clutch retainer 30 and a faster rate of wear to the inner retainer 30 due to the increase in acceleration time of the clutch plates. Additionally, this damage causes catching and dragging of the outer splined clutch discs, further causing clutch apply and release timing issues and/or excessive heat buildup resulting in shifting issues and/or clutch failure.

The present inventors have further identified that it would be disadvantageous to simply use a steel inner clutch retainer 30 to avoid such damage. In particular, a full steel clutch retainer would be very heavy as compared to the high silicate casting aluminum used in the prior art transmissions described above. The excess weight of the clutch retainer can cause more stress and wear on mating components, as well as resulting in reduced performance of the transmission.

Accordingly, the present inventors have developed the presently disclosed methods and devices for preventing such failures in transmissions, which as discussed below provide advantages for new transmissions as well as repairs, replacements, and upgrades for existing transmission designs. In particular, the present inventors have recognized that the damage to the clutch retainer, including an aluminum clutch retainer, can be prevented by providing a wear insert on the sides of the castellations that engage with the splines of the clutch plates, for example with the wear inserts comprising steel. As discussed further below, this can advantageously be performed in multiple ways depending on the needs of the owner or repair technician, including to allow use of an OE clutch housing or OE clutch plates and other OE components.

Figure 4:
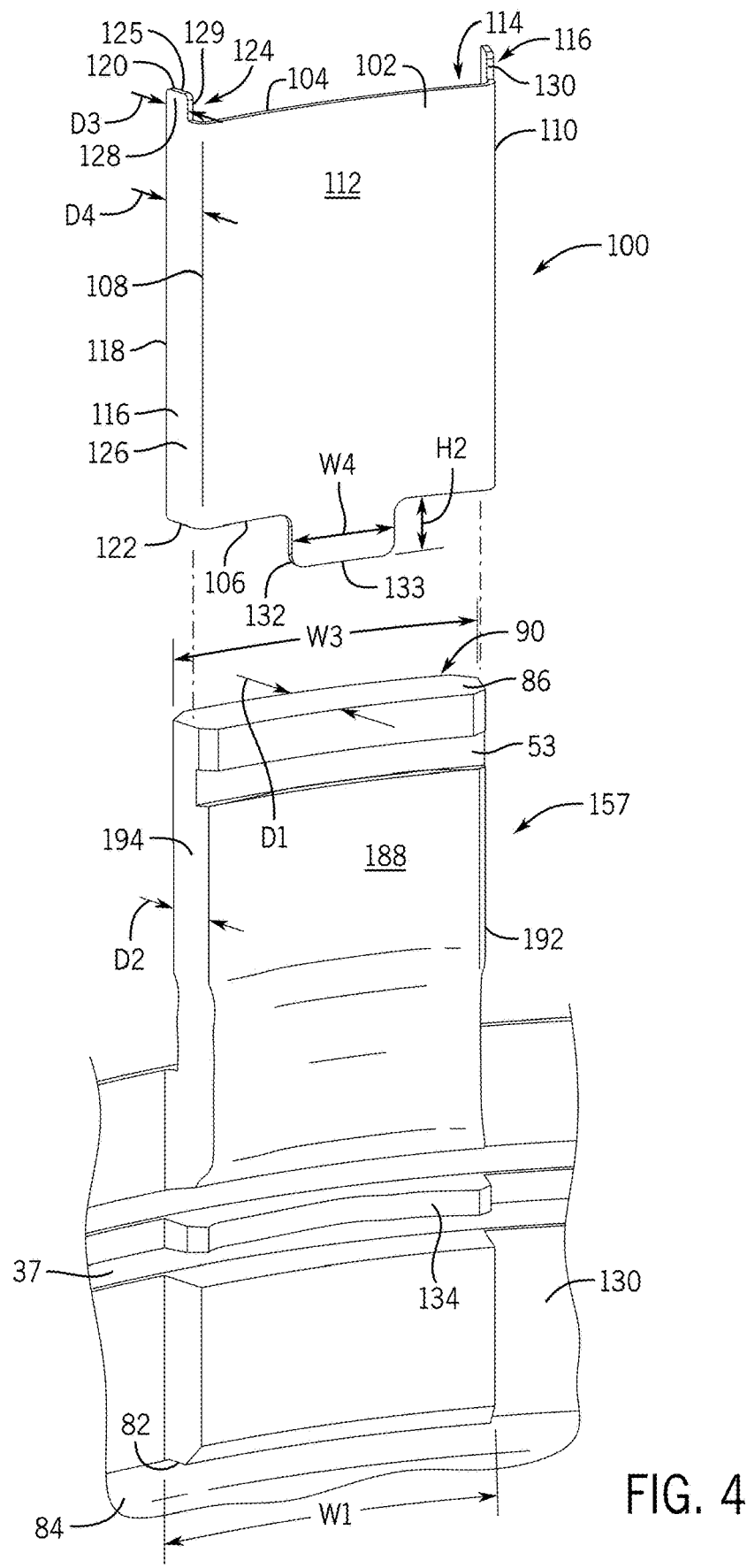
FIG. 4 is a close up exploded perspective view of an embodiment of wear insert for use with a clutch inner housing to prevent damage from clutch plates according to the present disclosure.
Figure 5:
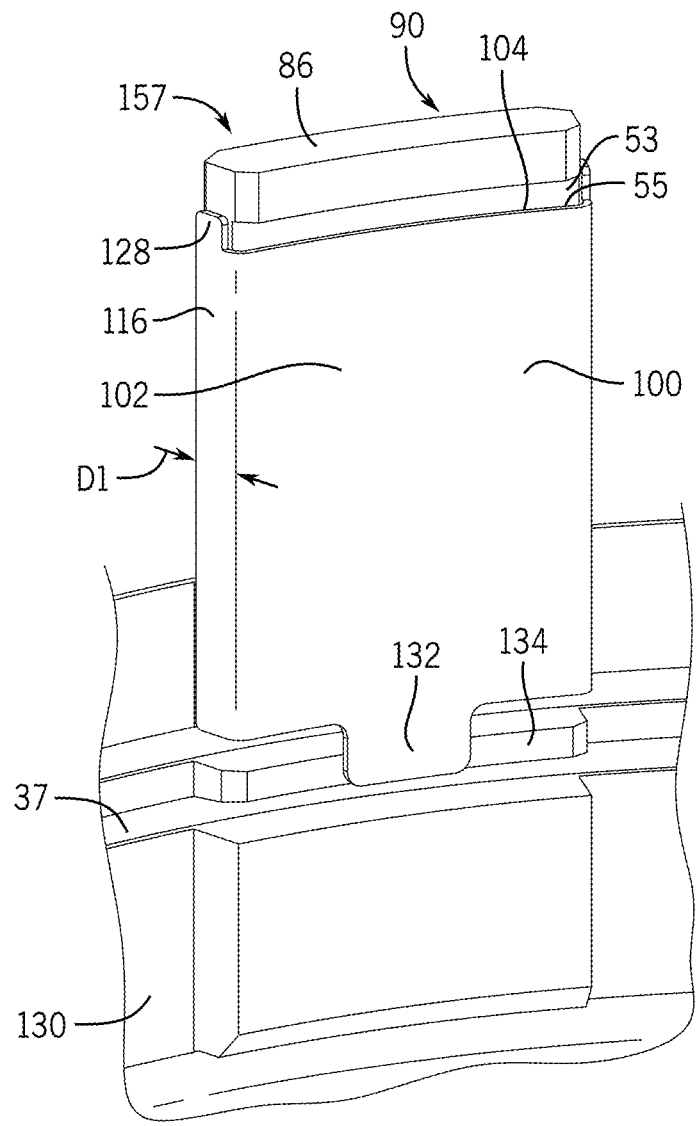
FIG. 5 is a close up perspective view of the wear insert positioned with a castellation of the clutch inner housing of FIG. 4 according to the present disclosure.
Figure 6:
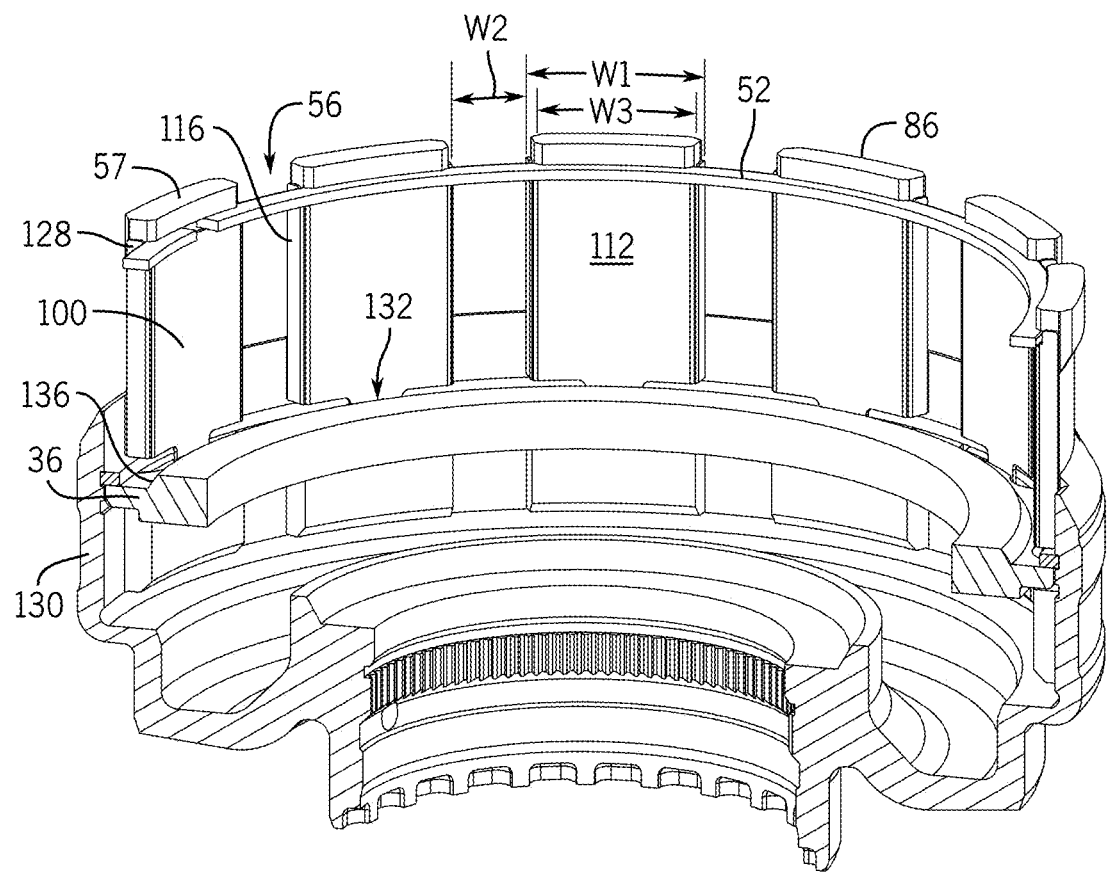
FIG. 6 is a sectional perspective view of the wear insert of FIG. 4 and others positioned on castellations of the clutch inner housing, retained in position according to the present disclosure.

FIGS. 4-6 show a first embodiment of a wear insert 100 being used with a clutch housing 130 that has been either modified from or designed differently than an OE clutch housing 30 such as shown in FIG. 1, but is configured to function within the same transmissions discussed in conjunction with FIG. 1, including with use of the same OE clutch plates 42 (or a conventionally known replacement). It should be recognized that like reference numbers will be used where the same or similar parts could be reduced. In certain cases, modified parts are labeled with similar numbers but incremented by 100. Like the clutch housing discussed above, the clutch housing 130 has castellations 157, which extend up to free ends 86, have inner sides 88 and outer sides 90, and have first sides 192 and second sides 194. The present inventors have recognized that in order to reuse the same OE style clutch plates 42, the widths W2 (FIG. 2) of the gaps 56 between castellations 157 needs to be similar to the gaps 56 of OE clutch housings 30. Therefore, to accommodate for positioning wear inserts 100 between the first side 192 and the opposing second side 194 of adjacent castellations 157, widths W3 between the first side 192 and the second side 194 of a given castellation 157 must be reduced as compared to the width W1 of the OE clutch housing 30 (at least where the wear insert 100 is present). Likewise, a depth D2 of the castellation 157 must be reduced from the depth D1 of the castellations 57 so as to provide the necessary radial clearance for the clutch plates (at least where the wear insert 100 is present). The reduced widths and depths may be provided via machining (e.g., cutting or grinding away the material corresponding to the thickness of the wear insert 100 material), or a new clutch housing may be formed that already has these reduced dimensions.

In the embodiment of FIGS. 4-6, the wear inserts 100 have a generally channel-shaped or u-shaped cross-section comprising a body 102 that extends from a first end 104 to a second end 106, from a third end 108 to a fourth end 110, and having an inner side 112 and an outer side 114. Legs 116 extend perpendicularly from the third end 108 and the fourth end 110 of the body 102, whereby in the present embodiment the legs 116 are formed by bending. Each leg 116 extends away from the body 102 to a free end 118 and also extend from a first end 120 to a second end 122 and has an inner side 124 and an outer side 126 defining a thickness therebetween 125. The second end 122 of the leg 116 is shown to be aligned with the second end 106 of the body 102. The first end 120 of the leg 116 extends farther than the first end 104 of the body 102, thereby forming a finger or tab 128. A depth D3 from the free end 118 to a tab end 129 of the leg 116 is less than a depth D4 from the free end 118 to the to the third end 108 of the body 102. Therefore, the tab 128 does not extend entirely in the depth (or in use, radial) direction to the body 102. As shown in FIG. 5, the first end 104 of the body 102 is approximately flush with a floor 55 of the slot 53 configured to receive the retaining ring 52 (FIG. 6) for retaining the clutch plates in position axially. In this manner, the same OE retaining ring 52 can be used and is not obstructed by the wear insert 100. Additionally, the same OE retaining ring 52 advantageously retains the wear insert 100 in position axially, as well as radially by engagement with the tabs 128 extending farther than the first ends 104 of the body 102 of the wear inserts 100 when installed as shown in FIG. 6.

Referring again to FIGS. 4-6, another tab 132 extends away from the second end 106 of the body 102 to a free end 133 and is coplanar therewith. The tab 132 extends away from the second end 106 by a height H2 and has a width W4. When the wear insert 100 is fully positioned on the castellation 157, the tab 132 extends down to overlap, in the radial direction, a shelf 134 forming the upper bounds of the groove 37 for receiving the clutch reaction plate 36 therein. The tab 132 does not extend past the shelf 134, and thus the clutch retaining ring 38 being positioned within the groove 37 does not interfere with installation of the wear insert 100, which instead may be supported axially by the clutch reaction plate 36. Additionally, as shown in FIG. 6, an outer face 136 of the OE (or conventional aftermarket replacement) clutch reaction plate 36 prevents the wear insert 100 from moving radially via engagement with the tab 132. This engagement keeps the lower portion of the wear inserts 100 in position on the castellations 157 before the clutch packs are installed.

Figure 7:
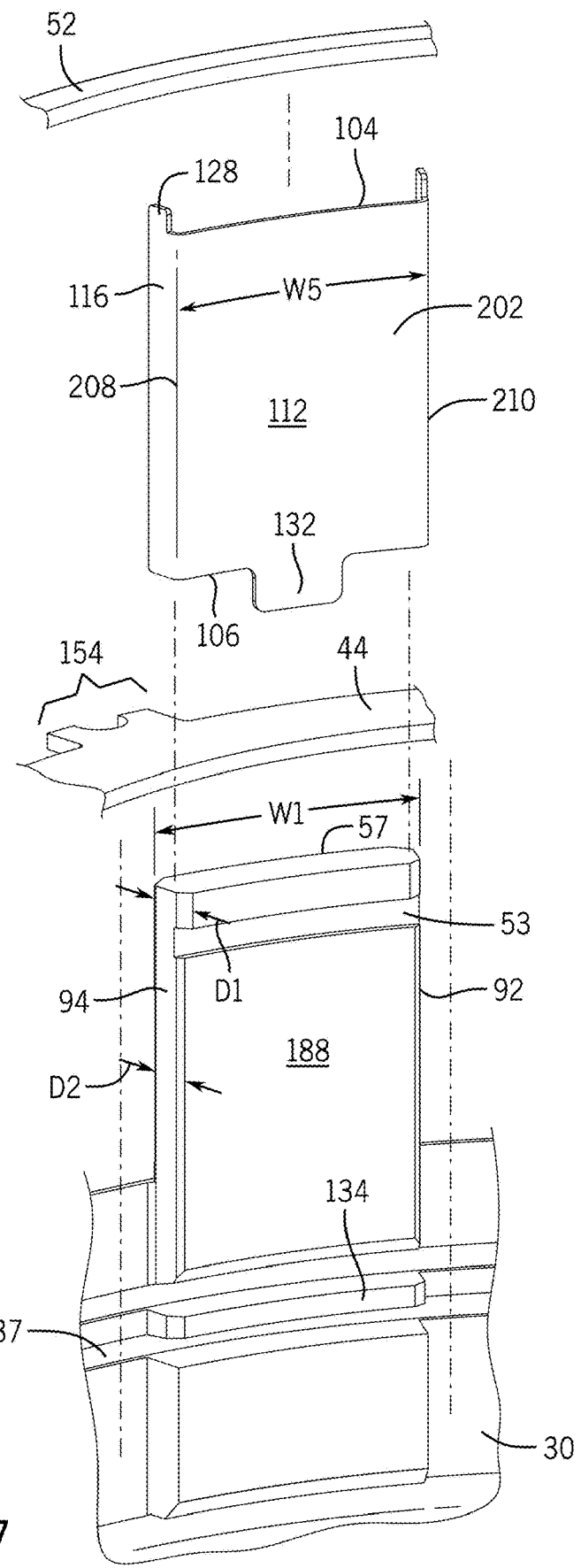
FIG. 7 is a close up exploded perspective view of another embodiment of wear insert for use with a clutch inner housing to prevent damage from clutch plates according to the present disclosure.
Figure 8A:
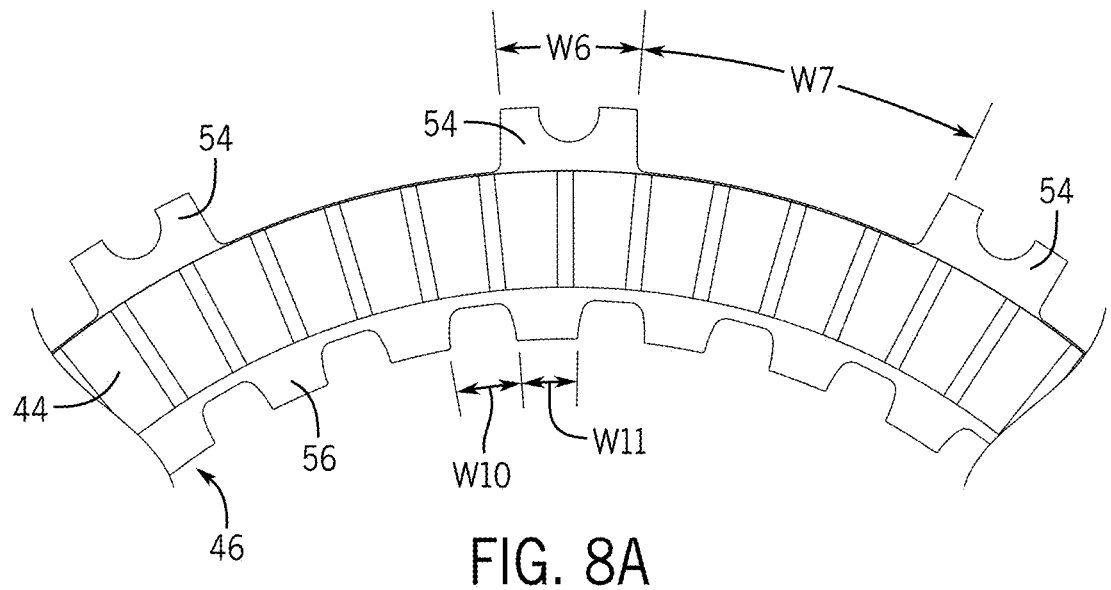
FIG. 8A is a partial top view of OE clutch plates as known in the art.
Figure 8B:
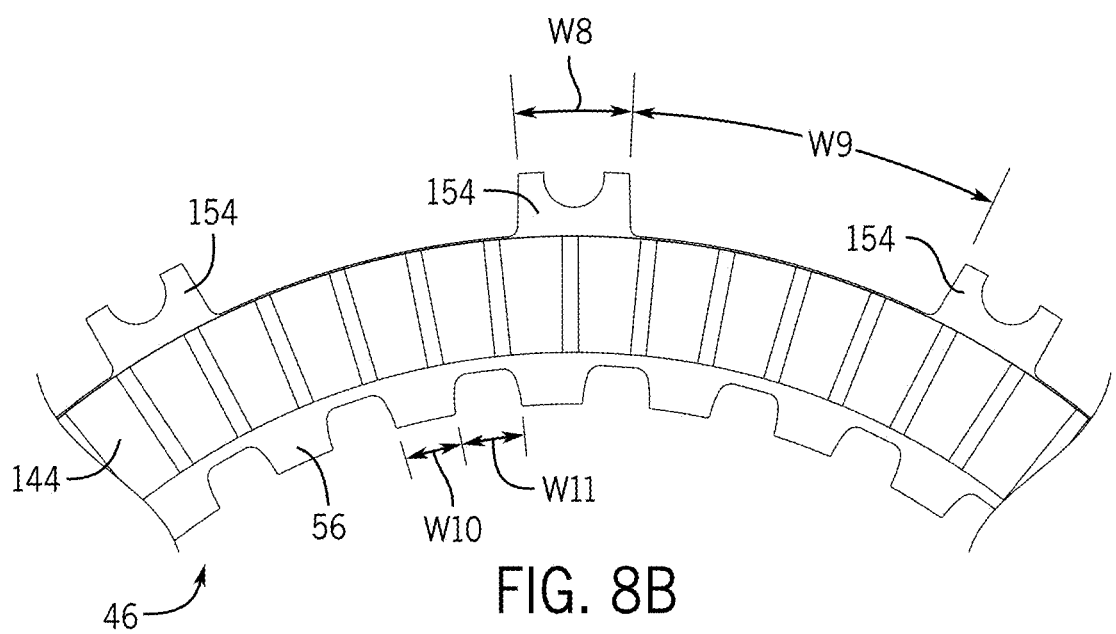
FIG. 8B is a partial top view of a new clutch plate configured for use with the wear insert and the clutch inner housing of FIG. 7 according to the present disclosure.

As discussed above, the embodiment of FIGS. 4-6 may be used with OE style clutch plates since the gaps 56 between castellations 157 remain the appropriate size even with the wear inserts 100 installed. FIG. 7 shows another embodiment of a wear insert 200, which in this case is configured for use with an OE clutch housing 30 such as that described above, and without any reduction of material thereof. The wear insert 200 may be generally the same as the wear insert 100, but has a greater width W5 between the third end 208 and the fourth end 210 to accommodate the castellations 57 having the original width W1. Since the legs 116 of the wear inserts 200 cover the first side 94 and the second side 96 of the castellations 57, which damage thereto according to the present disclosure, it should be recognized that the gap between adjacent wear inserts 200 of adjacent castellations 57 is less than the gap 56 between the castellations 57 alone (see FIG. 1). With reference to FIGS. 8A and 8B, this provides that different clutch plates must be used since the externally-toothed OE clutch plates 44 have external splines 54 that are too large for the reduced gap after the wear inserts 200 are added. FIG. 8A shows an externally-toothed OE style clutch plate 44 atop an internally-toothed OE style clutch plate 46. The externally-toothed clutch plate 44 has external splines 54 that span a width W6 and are separated by a width W7. As mentioned, the width W6 exceeds the gap between the wear inserts 200 when positioned on the castellations 57. Thus, FIG. 8B shows an alternative externally-toothed clutch plate 144 atop an internally-toothed OE style clutch plate 46. The externally-toothed clutch plate 144 has external splines 154 that each have a width W8 that is less than the width W6 of the OE style clutch plate 44. The splines 154 are separated by a width W9 that is greater than the width W7 for the OE style clutch plate 44. These widths W6, W9 are appropriately sized to correspond to the gap between the wear inserts 200 when used in conjunction with an OE clutch housing 30. By way of non-limiting example, the above widths may be as follows: W6: 0.537"; W7: 1.205"; W8: 0.491"; and W9: 1.246".

The present inventors have recognized that, advantageously, the same internally-toothed single-sided OE style clutch plates 46 with internal teeth 56 can also be used despite the addition of the wear inserts 200, since the internal teeth 56 and corresponding clearance requirements are not changed. In other words, the internal teeth 56 can retain the same width W10 and be separated by the same width W11.

Figure 9:
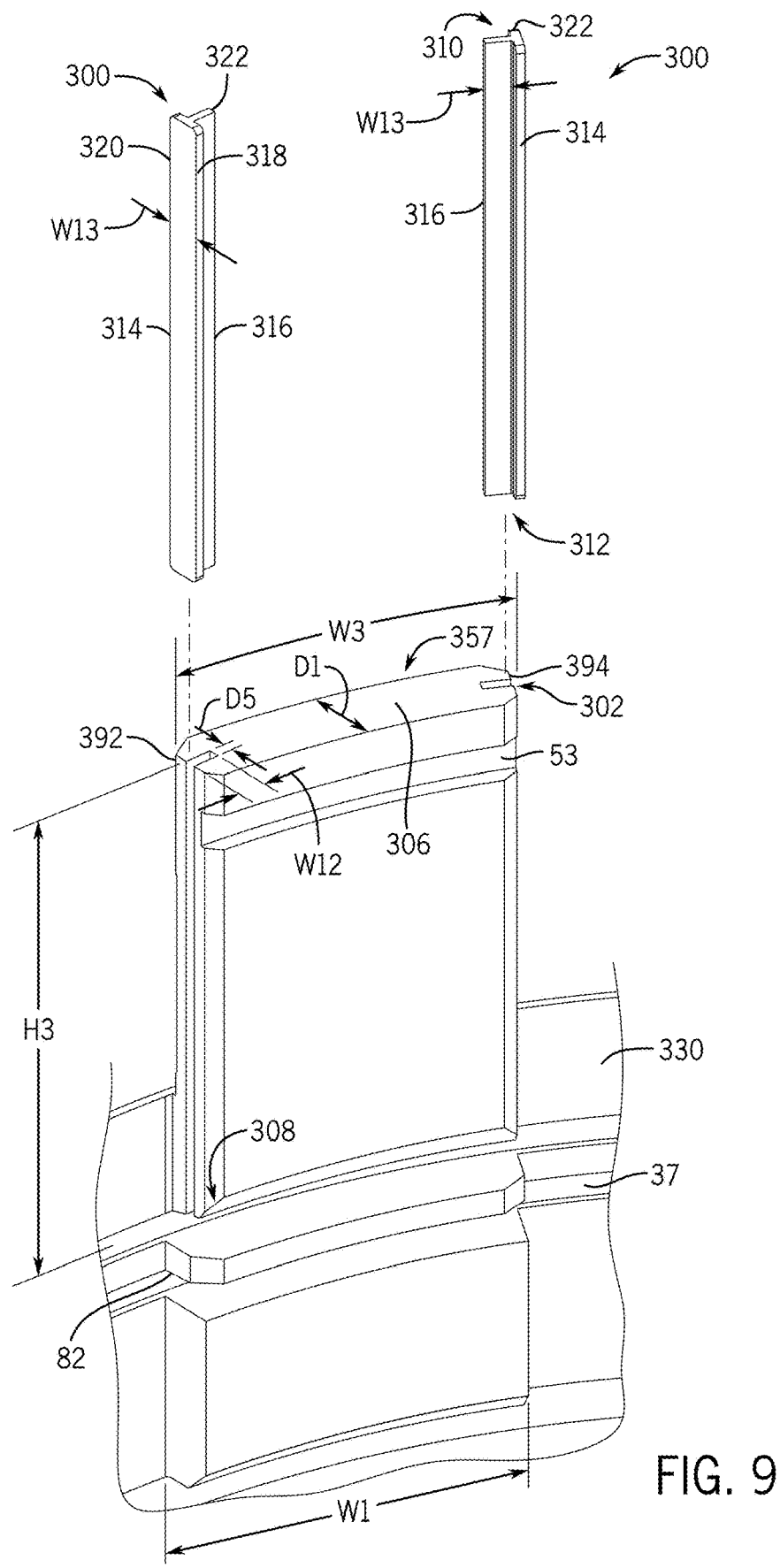
FIG. 9 is a close up exploded perspective view of another embodiment of wear inserts for use with a clutch inner housing to prevent damage from clutch plates according to the present disclosure.
Figure 10:
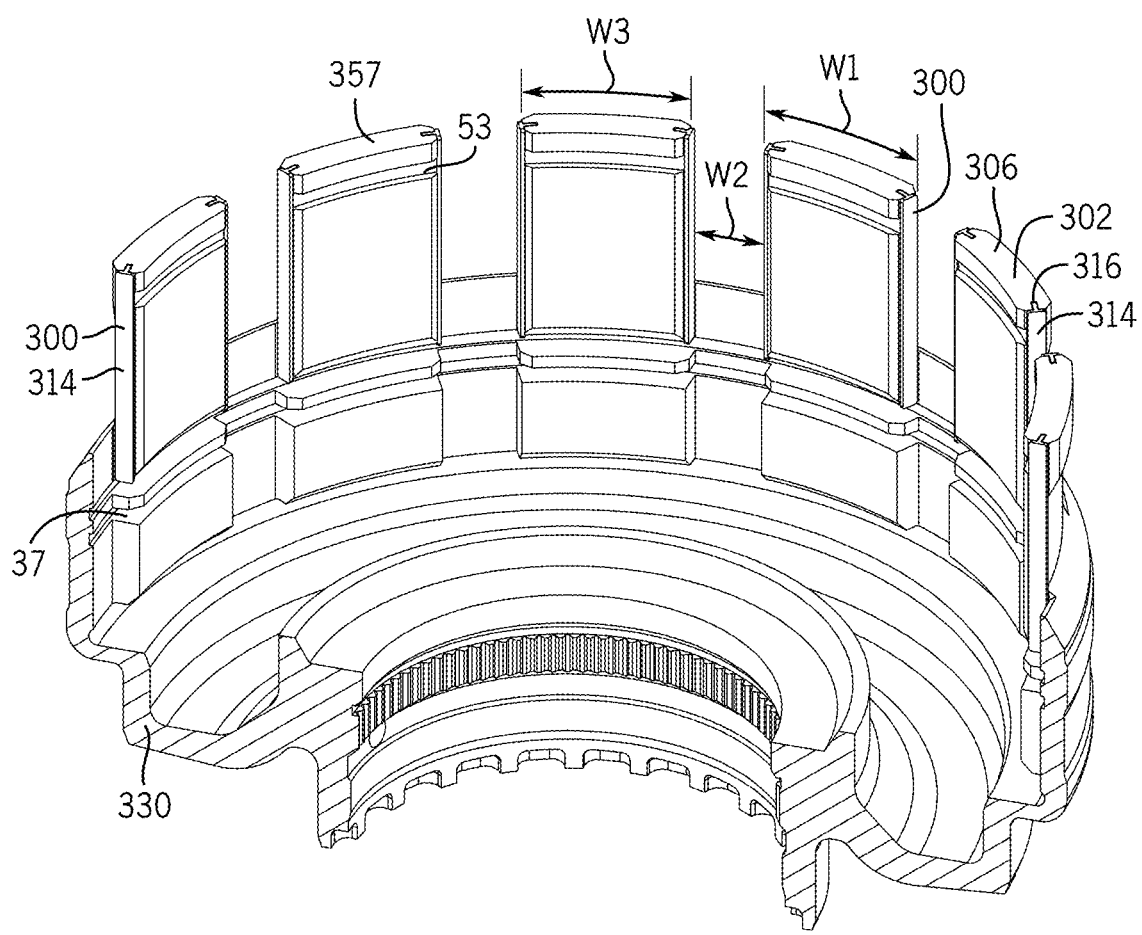
FIG. 10 is a close up perspective view of the wear inserts positioned with a castellation of the clutch inner housing of FIG. 9 according to the present disclosure.

FIGS. 9 and 10 depict one further embodiment for wear inserts 300 to prevent damage to castellations of a clutch housing, which again may be a modified OE clutch housing or a new clutch housing (and may require a new corresponding clutch plates, as discussed above). For brevity, the wear inserts 300 will be discussed as corresponding to a clutch housing 330 in which the castellations 357 have a reduced width W3 between a first side 392 and a second side 394 thereof. to account for the wear inserts 300 and thus results in the same gap between wear inserts 300 and castellations (e.g., to be able to use OE style clutch plates). In this case, the castellations 357 differ from a conventional OE clutch housing 30 (FIG. 1) in that slots 302 extend normally into the first side 392 and the second side 394, the slots 302 having a width W12 and a depth D5. The slots 302 extend from a free end 306 to an intermediate base end 308 so as to have a height H3 sufficient to cover the entire axial range in which the clutch plates would be positioned.

The wear inserts 300 have substantially t-shaped cross-sections, extending from a first end 310 to a second end 312 and having a base 314 with an extension 316 that extends perpendicularly therefrom by a width W13. The base 314 extends from an inner end 318 to an outer end 320. The base 314 and the extension 316 have a thickness 322 that is approximately equal the depth D5 of the slot in the castellation 357. The width W13 of the extension 316 is approximately equal to the width W12 of the slot 302 or channel. The thickness 322 of the base 314 is sufficient to protect the surface of the first side 392 and the second side 394 from damage by the splines of the clutch plate, for example being equal to or less than, approximately 75%, 66%, or 50% of the depth D1 of the castellations 357.

As shown in FIG. 10, the wear inserts 300 are configured such that the extensions 316 thereof are received within the slots 302 in the sides of the castellations 357. The wear inserts 300 may be fixed in this position via adhesives or other mechanisms known in the art The configuration of FIGS. 9 and 10 advantageously reduces the amount of material that must be removed from the castellations since the base 314 need not extend radially inwardly of the inner face 388 of the castellation.

Figure 11:
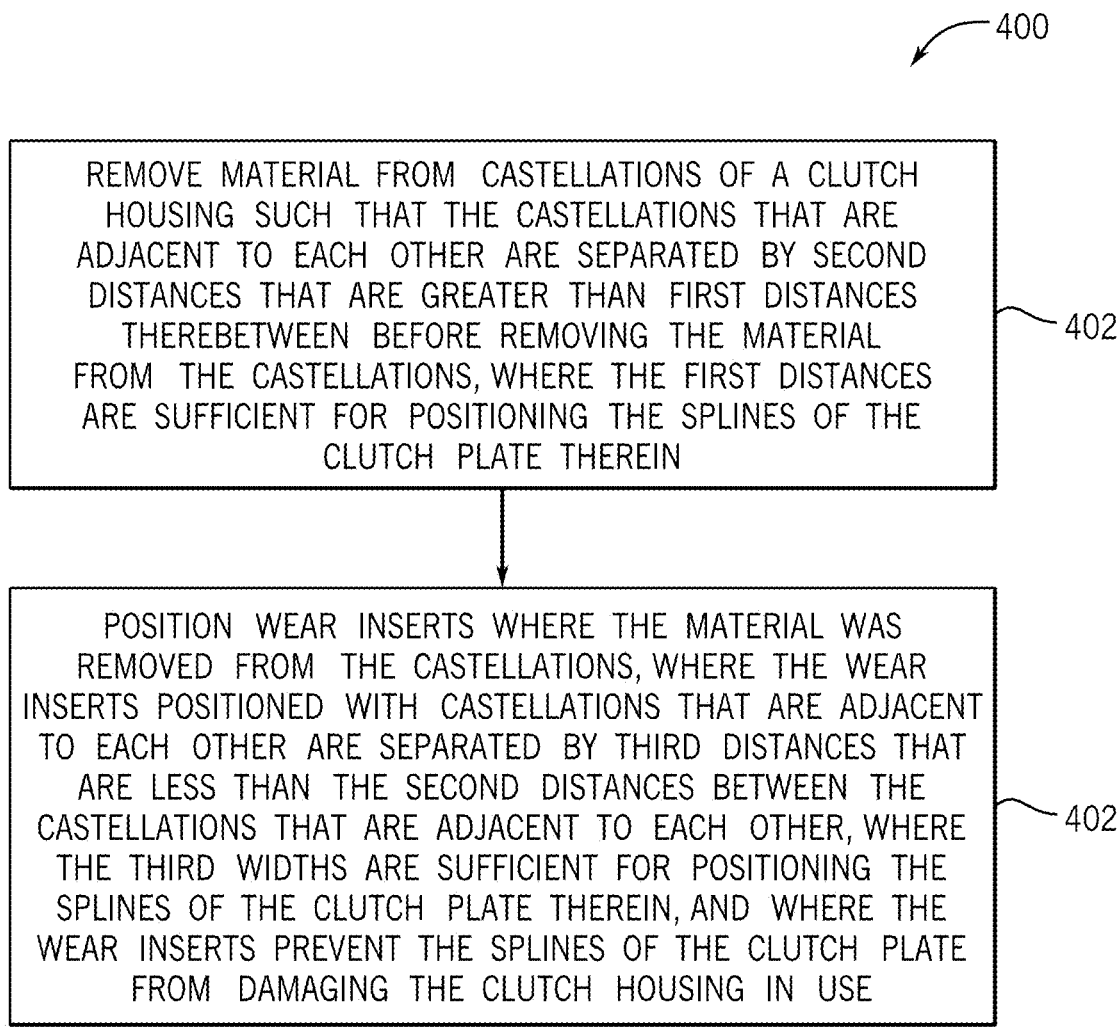
FIG. 11 is a flow chart depicting a method for preventing damage to a clutch housing from a clutch plate according to the present disclosure.

In this manner, the systems, devices, and methods described herein advantageously solve the problem of clutch plates damaging clutch inner retainer for transmissions. These solutions may be used in forward production, or may be used to repair or replace components within existing transmissions. By way of example, FIG. 11 depicts a method 400 for preventing damage to a clutch housing from a clutch plate according to the present disclosure. In step 402, material is removed from castellations of a clutch housing in which there are open gaps between the castellations for positioning splines of a clutch plate. It should be recognized that the gaps may be increased by removing material from one or both castellations corresponding thereto. Removing the material from the castellations that are adjacent to each other increases the open gaps therebetween so as to be separated by second distances that are greater than first distances before removing the material from the castellations. The first distances are sufficient for positioning the splines of the clutch plate therein. Step 404 provides for positioning wear inserts where the material was removed from the castellations, which may be similar to the wear inserts described above. The wear inserts positioned with castellations that are adjacent to each other are separated by third distances that are less than the second distances between the castellations that are adjacent to each other. The third widths are sufficient for positioning the splines of the clutch plate therein. The wear inserts prevent the splines of the clutch plate from damaging the clutch housing in use.

Figure 12:
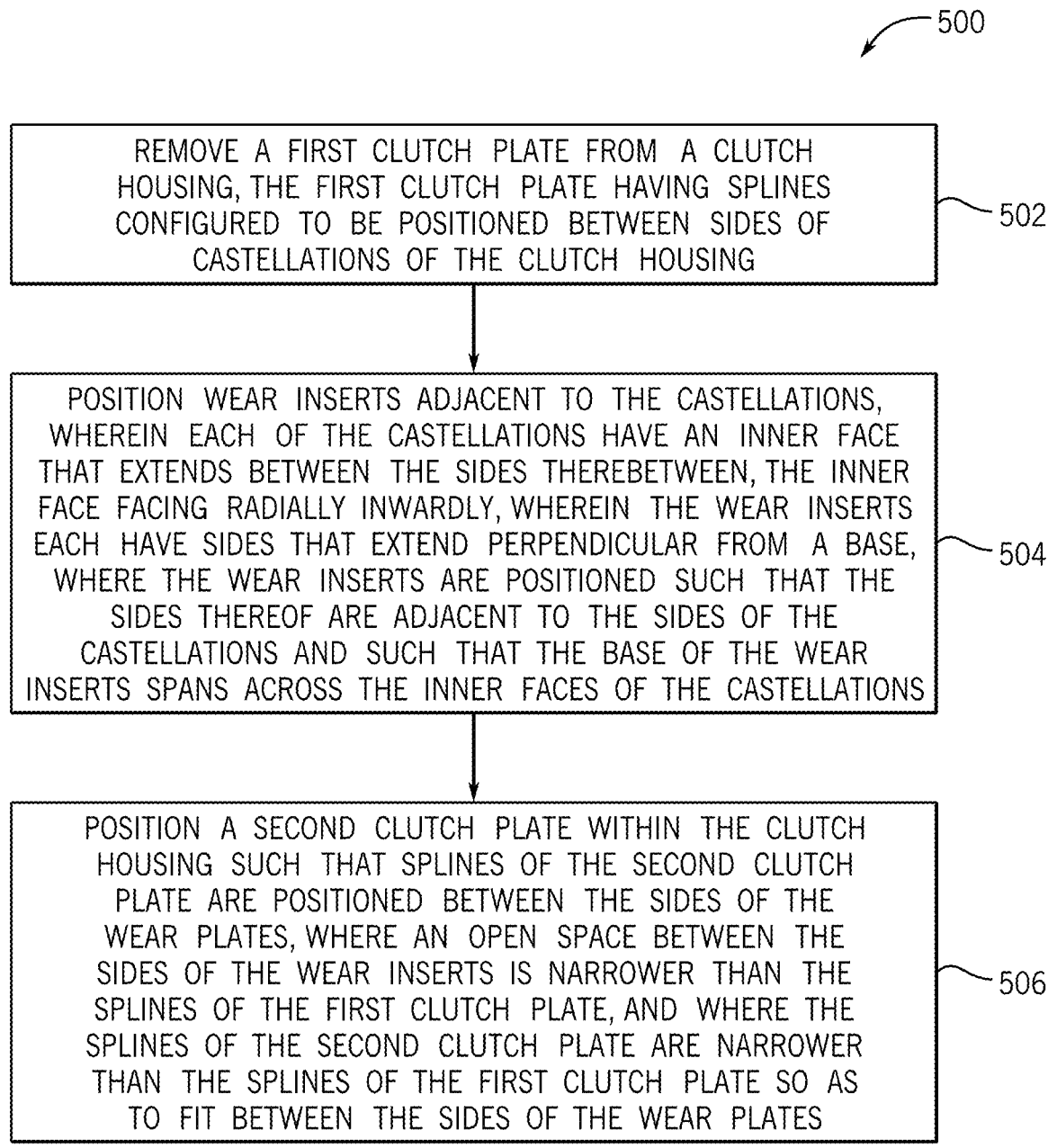
FIG. 12 is a flow chart depicting a method for modifying a clutch housing to prevent damage thereto according to the present disclosure.

FIG. 12 shows a method 500 for modifying a clutch housing to preventing damage thereto according to the present disclosure. Step 502 provides for removing a first clutch plate from the clutch housing, whereby the first clutch plate has splines configured to be positioned between sides of castellations of the clutch housing. Step 504 provides for positioning wear inserts adjacent to the castellations, where each of the castellations has an inner face that extends between the sides therebetween, the inner face facing radially inwardly, wherein the wear inserts each comprise sides that extend perpendicularly from a base, and where the wear inserts are positioned such that the sides thereof are adjacent to the sides of the castellations and such that the base of the wear inserts spans across the inner faces of the castellations. Step 506 provides for positioning a second clutch plate within the clutch housing such that splines of the second clutch plate are positioned between the sides of the wear plates, where an open space between the sides of the wear inserts is narrower than the splines of the first clutch plate, and wherein the splines of the second clutch plate are narrower than the splines of the first clutch plate so as to fit between the sides of the wear plates.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method of preventing damage to a clutch housing from a clutch plate, the clutch housing having castellations with open gaps therebetween for positioning splines of the clutch plate, the method comprising:
   removing material from the castellations such that the castellations that are adjacent to each other are separated by second distances that are greater than first distances therebetween before removing the material from the castellations, wherein the first distances are sufficient for positioning the splines of the clutch plate therein; and
   positioning wear inserts where the material was removed from the castellations, wherein the wear inserts positioned with castellations that are adjacent to each other are separated by third distances across the open gaps that are less than the second distances across the open gaps between the castellations that are adjacent to each other, wherein the third distances are sufficient for positioning the splines of the clutch plate therein, and wherein the wear inserts prevent the splines of the clutch plate from damaging the clutch housing in use.

2. The method according to claim 1, wherein the material is removed from opposing sides of each of the castellations.

3. The method according to claim 1, wherein the castellations are positioned in a circular arrangement such that inner faces face radially inwardly, further comprising removing material from the inner faces of the castellations that face radially inwardly from the circular periphery, and positioning the wear inserts where the material was removed from the inner faces.

4. The method according to claim 1, wherein the material is removed from the castellations such that the third distances between the wear inserts positioned with castellations that are adjacent to each other are approximately equal to the first distances between the castellations that are adjacent to each other before removing the material from the castellations.

5. The method according to claim 1, wherein the castellations are positioned in a circular arrangement such that inner faces face radially inwardly, further comprising positioning a snap ring to prevent the wear inserts from moving radially inwardly away from the inner faces of the castellations.

6. The method according to claim 1, wherein the castellations are positioned in a circular arrangement such that inner faces face radially inwardly, and wherein the wear inserts are positioned so as to span across the inner faces between opposing sides of the castellations, respectively.

7. The method according to claim 1, further comprising removing the clutch plate before removing the material from the castellations, and further comprising re-installing the clutch plate such that the splines are positioned within the open gaps after the wear inserts are positioned where the material was removed from the castellations.

8. The method according to claim 1, wherein the castellations are positioned in a circular arrangement such that inner faces face radially inwardly, and wherein the wear inserts are positioned on opposing sides of the castellations without spanning across the inner faces thereof.

9. The method according to claim 1, wherein the wear inserts comprise bases and tabs that extend in an axial direction farther than a base when positioned adjacent to the sides of the castellations, whereby the tabs prevent the wear inserts from moving radially inwardly from the castellations.

10. A clutch housing configured to prevent damage from a clutch plate, the clutch housing comprising:
    a circular base with castellations that extend upwardly therefrom in a circular arrangement, wherein the castellations extend in an axial direction from the circular base to free ends with inner faces that extend between the sides thereof, wherein the inner faces face radially inwardly in the circular arrangement; and
    wear inserts positioned adjacent to the sides of the castellations such that open gaps remain between the castellations that are adjacent to each other and between the wear inserts positioned therewith, wherein the open gaps are sufficient to position splines of the clutch plate therebetween, and wherein the wear inserts comprise bases and tabs that extend in an axial direction farther than the bases when positioned adjacent to the sides of the castellations, whereby the tabs prevent the wear inserts from moving radially inwardly from the castellations.

11. The clutch housing according to claim 10, further comprising a snap ring that prevents the wear inserts from moving radially inwardly away from the inner faces of the castellations.

12. The clutch housing according to claim 10, further comprising a snap ring that prevents the wear inserts from moving axially away from the circular base.

13. The clutch housing according to claim 10, wherein the wear inserts each comprise sides that extend perpendicularly from the base that extends therebetween, and wherein the bases of the wear inserts are positioned to span across the inner faces of the castellations, respectively.

14. The clutch housing according to claim 13, wherein the sides of the wear inserts extend closer than the bases thereof to free ends of the castellations to form the tabs on the sides, and wherein the tabs prevent the wear inserts from moving radially inwardly away from the inner faces of the castellations.

15. The clutch housing according to claim 10, wherein the castellations extend upwardly from the circular base to tops each in an axial direction, wherein the tabs of the wear inserts extend from the bases thereof, wherein the tabs extend a first distance from the tops of the castellations in the axial direction that is greater than a second distance between the tops and the main bodies in the axial direction when the wear inserts are positioned with the castellations, and wherein the tabs prevent the wear inserts from moving radially inwardly away from the inner faces of the castellations.

16. The clutch housing according to claim 15, wherein a backing plate extends radially inwardly from the circular base, wherein the backing plate prevents the tabs from moving radially inwardly when wear inserts are positioned with the castellations.

17. The clutch housing according to claim 15, wherein a backing plate extends radially inwardly from the circular base, wherein the backing plate prevents the tabs from moving tangentially towards the open gaps when wear inserts are positioned with the castellations.

18. The clutch housing according to claim 10, wherein a channel is formed in at least one of the sides of each of the castellations, and wherein the wear inserts are at least partially recessed within the channels when positioned with the castellations.

19. The clutch housing according to claim 18, wherein the channel is further formed in the inner face of each of the castellations and the wear inserts are at least partially recessed therein.

20. The clutch housing according to claim 10, wherein a closest distance between the castellations that are adjacent to each other is approximately equal to a closest distance between the wear inserts positioned therewith.

21. The clutch housing according to claim 10, wherein the castellations comprise aluminum and the wear inserts comprise steel.

22. The clutch housing according to claim 10, wherein the wear inserts are positioned on the sides of the castellations without spanning across the inner faces thereof.

23. A method for modifying a clutch housing to preventing damage thereto, the method comprising:

removing a first clutch plate from the clutch housing, the first clutch plate having splines configured to be positioned between sides of castellations of the clutch housing, wherein the castellations extend upwardly in an axial direction;

positioning wear inserts adjacent to the castellations, wherein each of the castellations comprises an inner face that extends between the sides therebetween, the inner face facing radially inwardly, wherein the wear inserts each comprise sides that extend perpendicularly from a base, wherein the wear inserts are positioned such that the sides thereof are adjacent to the sides of the castellations and such that the base of the wear inserts spans across the inner faces of the castellations, and wherein the wear inserts comprise tabs that extend in the axial direction farther than the bases when positioned with the castellations, whereby the tabs prevent the wear inserts from moving radially inwardly from the castellations; and positioning a second clutch plate within the clutch housing such that splines of the second clutch plate are positioned between the sides of the wear plates, wherein an open space between the sides of the wear inserts is narrower than the splines of the first clutch plate, and wherein the splines of the second clutch plate are narrower than the splines of the first clutch plate so as to fit between the sides of the wear plates.

* * * * *